US009181979B2

(12) United States Patent
Fan et al.

(10) Patent No.: US 9,181,979 B2
(45) Date of Patent: Nov. 10, 2015

(54) HYBRID TYPE MAGNET BEARING SYSTEM (75) Inventors: Yi-Hua Fan, Tao-Yuan (TW);
Ying-Tsun Lee, Tao-Yuan (TW);
Chung-Chun Wang, Tao-Yuan (TW);
Yi-Lin Liao, Tao-Yuan (TW)

(73) Assignee: CHUNG YUAN CHRISTIAN UNIVERSITY, Tao-Yuan (TW)

( * ) Notice: Subject to any disclaimer, the term of this patent is extended or adjusted under 35 U.S.C. 154(b) by 343 days.

(21) Appl. No.: 13/533,255

(22) Filed: Jun. 26, 2012

(65) Prior Publication Data
US 2013/0293050 A1 Nov. 7, 2013

(30) Foreign Application Priority Data

May 4, 2012 (TW) .............................. 101116083 A (51) Int. Cl.
*H02K 7/09* (2006.01)
*F16C 32/04* (2006.01)
*H02K 7/04* (2006.01)

(52) U.S. Cl.
CPC .............. *F16C 32/0429* (2013.01); *H02K 7/04* (2013.01); *H02K 7/09* (2013.01)

(58) Field of Classification Search
CPC .. F16C 32/04; F16C 32/0423; F16C 32/0425; F16C 32/0427; F16C 32/0429; F16C 32/0431; F16C 39/66; H02K 7/09; F05B 2240/511
USPC ....................................................... 310/90.5
See application file for complete search history.

(56) References Cited

U.S. PATENT DOCUMENTS

| 4,340,260 | A | * | 7/1982 | Forster et al. ................. 310/90.5 |
| 4,446,632 | A | * | 5/1984 | Dornier .......................... 34/103 |
| 5,751,089 | A | * | 5/1998 | Stridsberg ..................... 310/266 |
| 6,244,835 | B1 | * | 6/2001 | Antaki et al. ................. 417/356 |
| 6,265,798 | B1 | * | 7/2001 | Huang et al. ................. 310/90.5 |
| 7,462,950 | B2 | * | 12/2008 | Hu .................... 290/55 |
| 2009/0001731 | A1 | * | 1/2009 | Perlo et al. ..................... 290/55 |
| 2010/0007233 | A1 | * | 1/2010 | Sozanski ....................... 310/168 |
| 2010/0092317 | A1 | * | 4/2010 | Suhara et al. ............... 417/410.4 |
| 2011/0289960 | A1 | * | 12/2011 | Cho et al. ......................... 62/498 |
| 2012/0217831 | A1 | * | 8/2012 | Jore et al. ......................... 310/90 |

(Continued)

FOREIGN PATENT DOCUMENTS

| JP | 08178011 A | * | 7/1996 | .............. F16H 33/02 |
| WO | WO 2011059708 A2 | * | 5/2011 | |
| WO | WO2012008297 | * | 1/2012 | |

OTHER PUBLICATIONS

Takahata et al, JP08178011A Machine Translatoin, Jul. 1996.*

(Continued)

*Primary Examiner* — Quyen Leung
*Assistant Examiner* — Eric Johnson
(74) *Attorney, Agent, or Firm* — WPAT, PC; Justin King (57) ABSTRACT

A hybrid type permanent magnet bearing system which utilizes four permanent magnet rings to replace the mechanical bearings. These rings are divided into two separated groups along an axis, where each group has an inner ring and a separated outer ring. At least one permanent magnet ring has a surface facing the gap between the two groups but being not vertical to the axis. Hence, inside the gap, the magnetic field between these permanent magnet rings is not non-uniform over different directions, and then it may behave as the axial and radical bearing simultaneously.

11 Claims, 11 Drawing Sheets

(56) References Cited

U.S. PATENT DOCUMENTS

2012/0249035 A1* 10/2012 Ueda .................. 318/400.41
2013/0121821 A1* 5/2013 Ozaki et al. ............... 415/205

OTHER PUBLICATIONS

Fan, et, al., "Passive Magnetic Bearing Design for a Small Wind Generator System", 2011, Chun Yuan Christian University.

* cited by examiner

PRIOR ART

FIG.1A

PRIOR ART

HYBRID TYPE MAGNET BEARING SYSTEM

BACKGROUND OF THE INVENTION

1. Field of the Invention

The present disclosure relates generally to hybrid type magnet bearing system, and more particularly to bearing system uses permanent magnets to replace mechanical bearings and to provide axial and radical bearing functions simultaneously.

2. Background of the Related Art

The relative motion between different structures of a mechanism is very popular for industry and daily life. The bearing is popularly used to stable and support the action of the rotation axis when one or more of movement and/or rotation are required. For example, the ball bearing, the roller bearing and the needle bearing. Essentially, the bearing provides a rotation support between the rotator and the stator, so that the rotor indirectly contacts with the stator. Hence, the rotation and the movement of the bearing may reduce some disadvantages induced by the relative motion between the rotator and the stator, such as friction, vibration, noise, lose, and so on. However, the loss of the bearing itself also is un-avoidable. Hence, full lubrication and periodic maintenance are required, and then higher cost and lower throughput are unavoidable disadvantages.

In general, the loss of the bearing is a function of both the rotation and the movement between the bearing and the rotor/stator, i.e., the combination of the rotor and the stator. The higher the rotation rate of the bearing, the larger the dynamical frication loss between the bearing and the rotor/stator. Besides, due to the direct contact between the bearing and the rotor/stator, the static friction coefficient therebetween also is a key factor about how the motion of the bearing is driven by the rotor/stator. The loss of the bearing also is related to the details of the relative motion between the rotor and the stator, where the rotor and the stator are positioned over two opposite sides of the bearings. When the two structures (rotor and/or stator) over opposite sides of the bearing are only rotated around one same axis, the bearing only has to satisfy the requirement of axial motion. In contrast, when the two structures (rotor and/or stator) over opposite sides of the bearing are rotated around the same axis and moved perpendicularly to (radically to) the axis simultaneously, the bearing has to satisfy the requirements of both the axial motion and the radical motion.

Particularly, in a perpendicular mechanism, two structures (rotor and/or stator) on opposite sides of the bearing are perpendicularly arranged. Hence, the weight of the upper structure, even the weight of other elements positioned on and/or over the upper structure, is supported by the lower structure. Clearly, the bearing loss or other disadvantages will be more serious along the perpendicular direction. Accordingly, the axial bearing has to be particularly designed and will increase the complexity, cost and maintained difficulty of the combination of both axial and radical bearing system.

Accordingly, it is desired to develop a new bearing system for improving these disadvantages of the bearing system used to provide rotation support between two separated structures.

SUMMARY OF THE INVENTION

The invention provides the hybrid type magnet bearing system using the non-contact type bearing made of permanent magnet.

One preferred embodiment of this invention is a hybrid type magnet bearing system. The system has at least four magnet rings made of permanent magnet material(s). These magnet rings are divided into two groups which are separated mutually and arranged along an axial direction. Each group has an inner magnet ring and an opposite outer magnet ring. At least one magnet ring has an upper surface or a down surface being not perpendicular to the axial direction, especial has a surface being not perpendicular to the axial direction and facing another group of magnet rings. Hence, non-zero axial magnetic field and non-zero radical magnetic field may exist between the groups simultaneously, so that both axial and racial bearing functions may be stably and continuously provided.

By adjusting the magnetized direction and magnetized strength of each magnet ring, also by adjusting the shape of each magnet ring the relative geometric relation between different magnet rings, how the magnetic field between these magnet rings are distributed along the axial direction and the radical direction may be adjusted, even how the magnetic field are distributed between these magnet rings may be adjusted. Hence, the hybrid type magnet bearing system can provide both the axial and the radical bearing function between different structures simultaneously without using any other extra device.

With the advance of material technology, many permanent magnet materials are used in many different commercial products. For example, some candidate materials of the permanent magnet materials include, but not limited to, ferrite magnet, Al—Ni—Co alloy, Sm—Co alloy, Ne—Fe—B alloy, and so on. Hence, each magnet of the axial passive magnet bearing system may be made of commercial permanent magnet material(s), and satisfy the requirements of longer lifetime, higher magnetic flux, better stability, more uniform magnetic field, and so on.

Other preferred embodiments also are hybrid type magnet bearing system. The main characteristic of these embodiment is the usage of the magnetic force between different magnet rings for providing both axial and radical magnetic forces between the upper group of magnet rings and the lower group of magnet rings, which may behave as the radial bearing and the axial bearing between two structures connected to the groups of magnet rings respectively. For different embodiments, different magnet rings may have different geometric shapes or different magnetized situation, even magnetic conductors may be used to connect different magnet rings for enhancing the effect of the magnet field.

DETAILED DESCRIPTION OF THE INVENTION

The detailed description of the present invention will be discussed in the following embodiments, which are not intended to limit the scope of the present invention, but can be adapted for other applications. While drawings are illustrated with some details, it is appreciated that the quantity of the disclosed components may be greater or less than that disclosed, except expressly restricting the amount of the components.

Figure 1A:
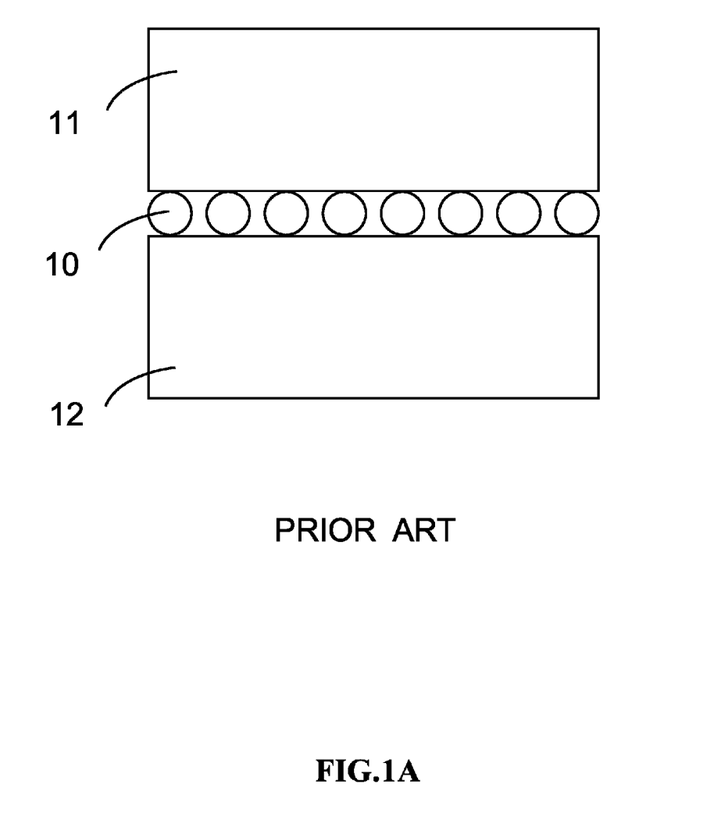
FIG. 1A and FIG. 1B are two representative cross-section diagrams of two well-known skills.

As shown on FIG. 1A, for a mechanical bearing system, at least one mechanical bearing 10 is positioned between first structure 11 and second structure 12 along an axial direction, also mechanical bearing 10 mechanically contacts with both structures 11/12 which are separated from each other. Once first structure 11 and second structure 12 has relative motion, such as slide or rotation, mechanical bearing 10 may rotate and/or slide to provide an elastic support between first structure 11 and second structure 12 so as to reduce friction, vibration, noise, loss and so on. Nevertheless, when the relative motions between structures 11/12 along the axial direction is obvious, mechanical bearing 10 can not properly provides the axial bearing function between structures 11/12. Hence, an extra mechanical mechanism independent on the mechanical bearing system is required to provide the axial bearing function.

Figure 1B:
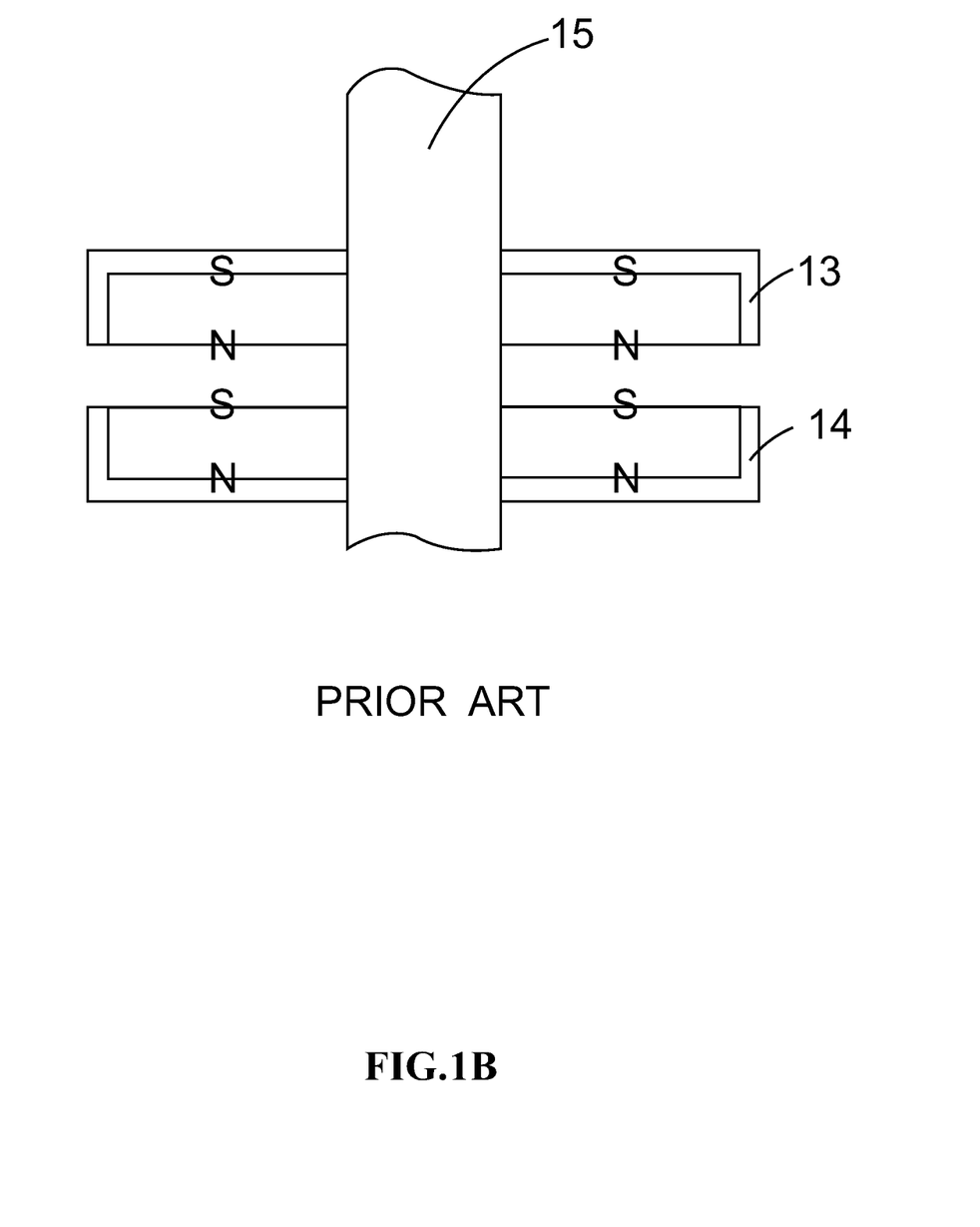

For example, as shown on FIG. 1B, third structure 13 and fourth structure 14 are separated from each other and arranged along main axis 15. First permanent magnet 16 and second permanent magnet 17 have opposite magnetized directions, and are positioned respectively on third structure 13 and fourth structure 14. Where, first permanent magnet 16 faces second permanent magnet 17. The permanent magnet material is very stable and can continuously provide stable magnet field for a long time. Many commercial permanent magnet materials have been applied to many mechanisms. Hence, the opposite magnetized directions of two permanent magnets 16/17 may push structure 13 away structure 14, and then provide a motion buffer between structures 13/14 along the axial direction. By combining the mechanisms shown on FIG. 1A and FIG. 1B, the axial bearing function and the radical bearing function may be provided simultaneously.

However, the usage of two different mechanisms for provide axial and radical bearing functions will have complex mechanism and higher hardware cost. Particularly, the mechanical bearings providing radical bearing function directly contacts first structure 11 and second structures 12, and then friction and loss are unavoidable. Hence, periodic maintenance for supplying lubrication and remove particles is required, so that the throughput of the whole mechanism is decreased.

The invention does not use the mechanical bearing, but use the magnetic field between some magnet rings made of permanent magnet material(s) to provide the axial bearing function and the radical bearing function simultaneously. These magnet rings are arranged along the axial direction and the radical direction simultaneously, the magnetized direction and the magnetized strength of each magnet ring is adjustable, also the shape and the size of each magnet ring is adjustable. Hence, the net magnetic field between the structures positioned along an axial direction is not parallel to the axial direction, and then both axial and radical bearing functions are provided simultaneously.

One preferred embodiment of the invention is a hybrid type magnet bearing system. As shown on FIG. 2A, the embodiment has at least four mutually separated magnet rings: first magnet ring 21, second magnet ring 22, third magnet ring 23 and fourth magnet ring 24. Third magnet ring 23 surrounds first magnet 21 and is positioned on a radial plane perpendicular to an axial direction, and fourth magnet ring 24 surrounds second magnet ring 22 and is positioned on another radical plane perpendicular to the axial direction. First magnet ring 21 and second magnet ring 22 are positioned along the axial direction, also second surface 225 of second magnet ring 22 faces first surface 215 of first magnet ring 21. Third magnet ring 23 and fourth magnet ring 24 are positioned along the axial direction, also third surface 235 of third magnet ring 23 faces fourth surface 245 of further magnet ring 24. First surface 215, second surface 225, third surface 235 and fourth surface 245 are not all vertical perpendicular to the axial direction, here, the degree of an angle between the axial direction and each of surfaces 215/225/235/245 is individual. Further, the first permanent magnet ring 21 and the third permanent magnet ring 23 are mechanically connected to a first structure 201, such as the rotator, and the second permanent magnet ring 22 and the fourth permanent magnet ring 24 are mechanically connected to a second structure 202, such as the stator.

Figure 2A:
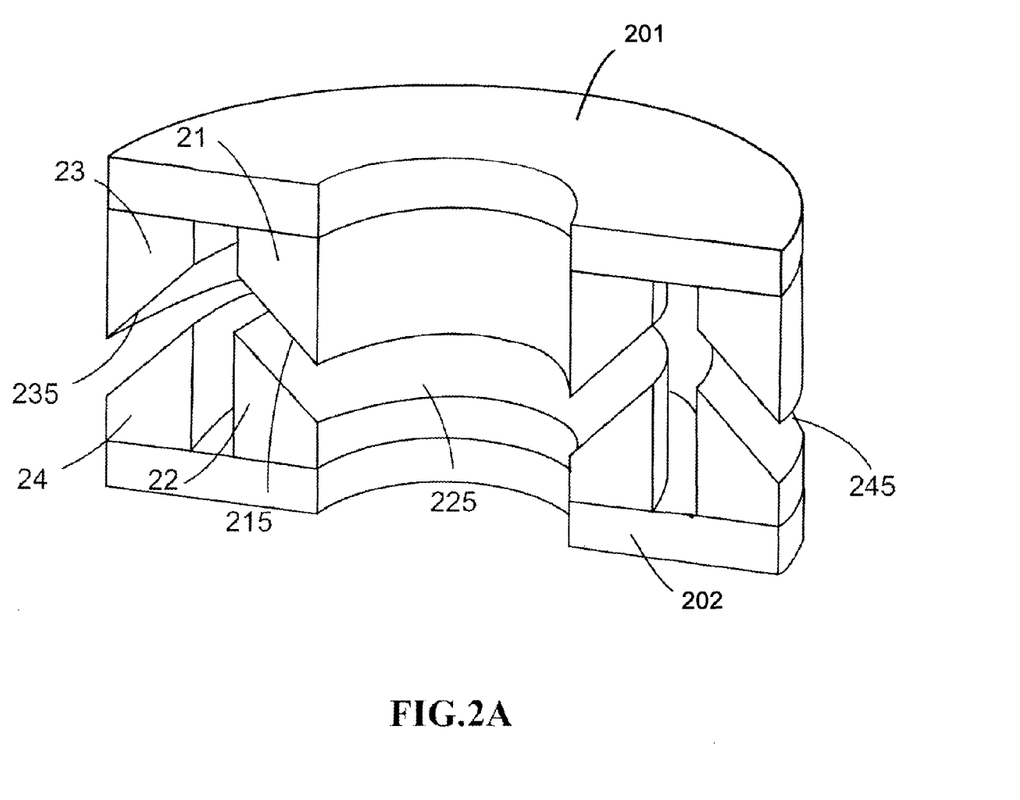
FIG. 2A to FIG. 2J are some representative schematic diagrams of some preferred embodiments of this invention.

Each of magnet rings 21/22/23/24 are made of permanent magnet material(s), such as hard ferrite magnet, Al—Ni—Co alloy, Sm—Co alloy, Ne—Fe—B alloy, any commercial permanent magnet material, any on-developing permanent magnet materials, or any combination thereof. Essentially, to provide the required magnetic field, the proposed invention mainly utilizes some advantages of the permanent magnet materials such as higher residual magnetic flux density, higher coercively, and larger magnetic energy. Of course, to properly shape permanent magnet material(s) as ring type of magnet and properly position the magnet ring on and/or in the rotor/stator, it is optional to use any permanent magnet material having the following characteristics: lower thermal expansion coefficient, higher upper limitation of working temperature, and easily to be mechanical processed. Some non-illustrated examples and non-discussed examples use the Ne—Fe—B alloy, but different examples of this proposed invention still may use other permanent magnet material, or a combination of some permanent magnet materials, or any processed permanent magnet material(s). For example, but not limited to, stabilized processed permanent magnet material or permanent magnet material with protective layer on the surface.

In this embodiment, the magnetized direction of first magnet ring 21 is equal to the magnetized direction of fourth magnet ring 24, both are parallel to, i.e., equal to, the axial direction. In contrast, the magnetized directions of both second magnet ring 22 and third magnet ring 23 are opposite to the axial direction. Further, the magnetized strength is same for each of magnet rings 21/22/23/24. Therefore, as shown on FIG. 2B, along the axial direction and between magnet rings 21/22, and between magnets 23/24, the net magnetic field (B1, B2) are not parallel to or perpendicular to the axial direction but are along direction(s) crossing the axial direction. The two magnetic fields (B1, B2) have same components (both direction and amplitude) along the axial direction, but have opposite components (opposite directions but same amplitude) along the radical direction. Herein, the arrow symbol inside magnet rings 21/22/23/24 indicates the magnetized direction, and the length of the arrow symbol indicates the corresponding magnetized strength. Further, the first permanent magnet ring 21 and the second permanent magnet ring 22 are mechanically connected to a first structure 201, such as a rotator, and the second permanent magnet ring and said fourth permanent magnet ring are mechanically connected to a second structure 202, such as the stator.

Figure 2B:
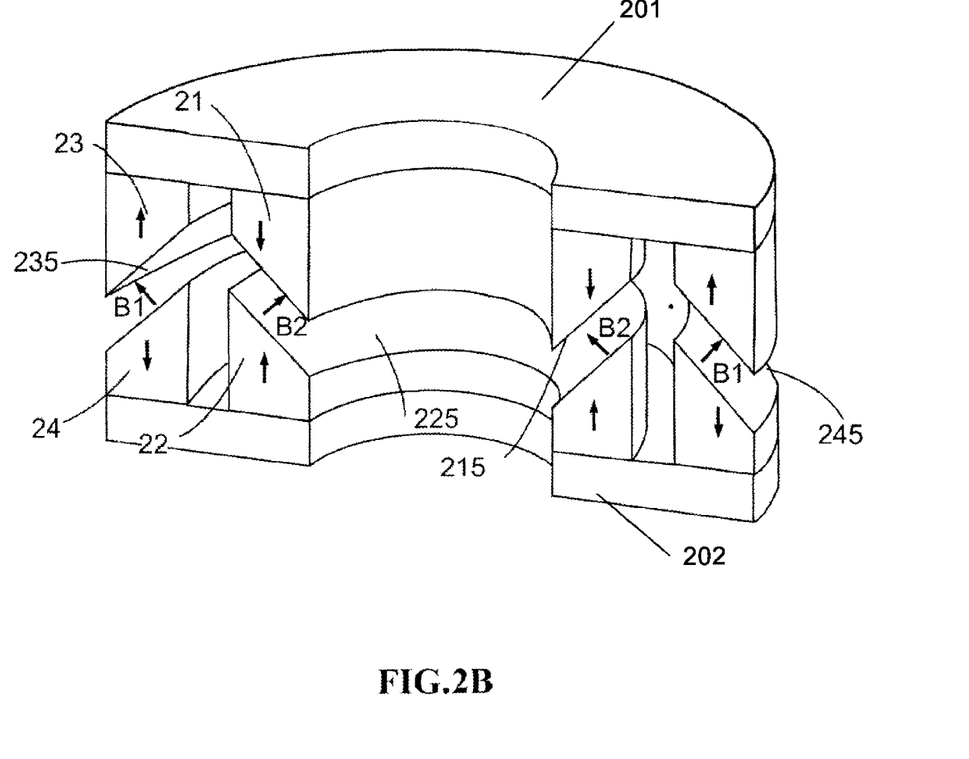

When first magnet ring 21 and third magnet ring 23 are mechanically connected to first structure and second magnet ring 22 and fourth magnet ring 24 are mechanically connected to second structure, the axial component of the net magnet field may keep the distance between the group of magnet rings 21/23 and another group of magnet rings 22/24 at an optimum relative distance. Because the magnetic force is inverse proportional to the square of the relative distance, the axial magnetic force and the relative motion between first/second structures will be balanced on an optimum relative distance.

Figure 2C:
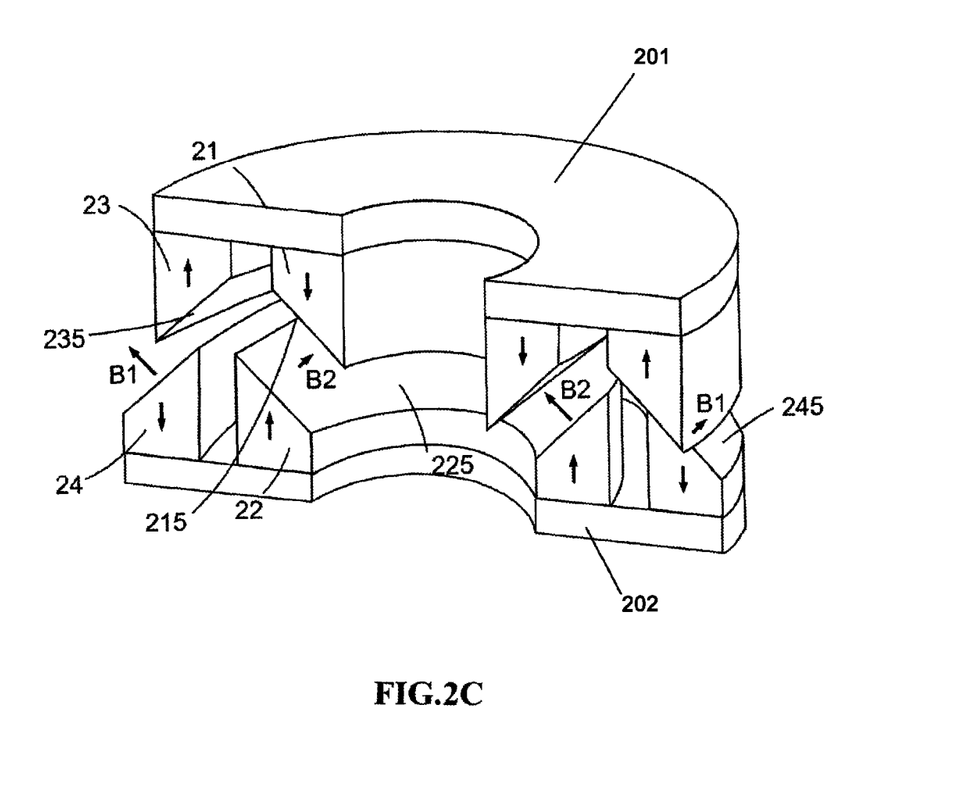
Figure 2D:
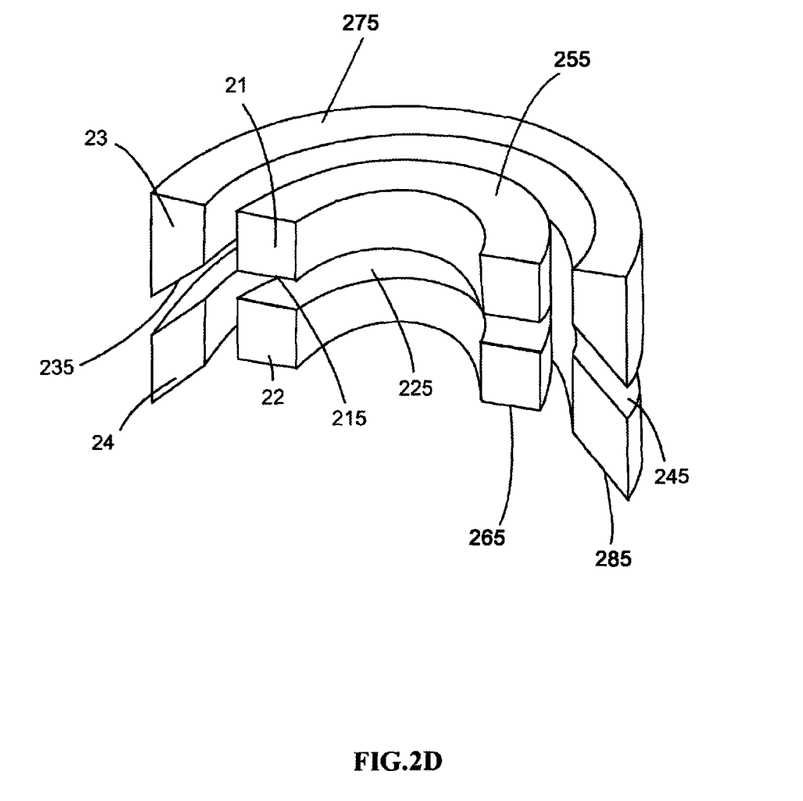
Figure 2E:
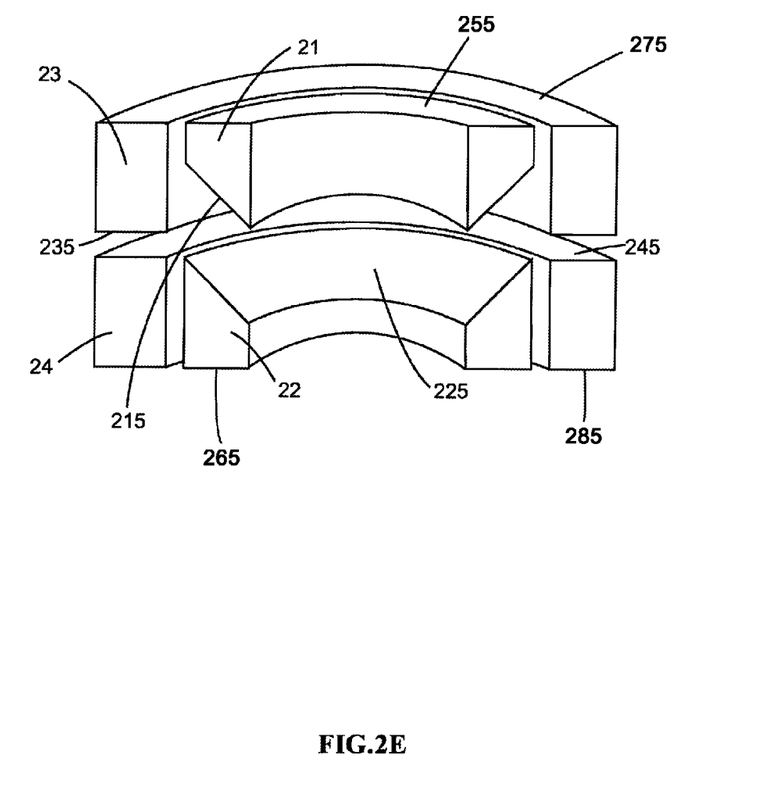
Figure 2F:
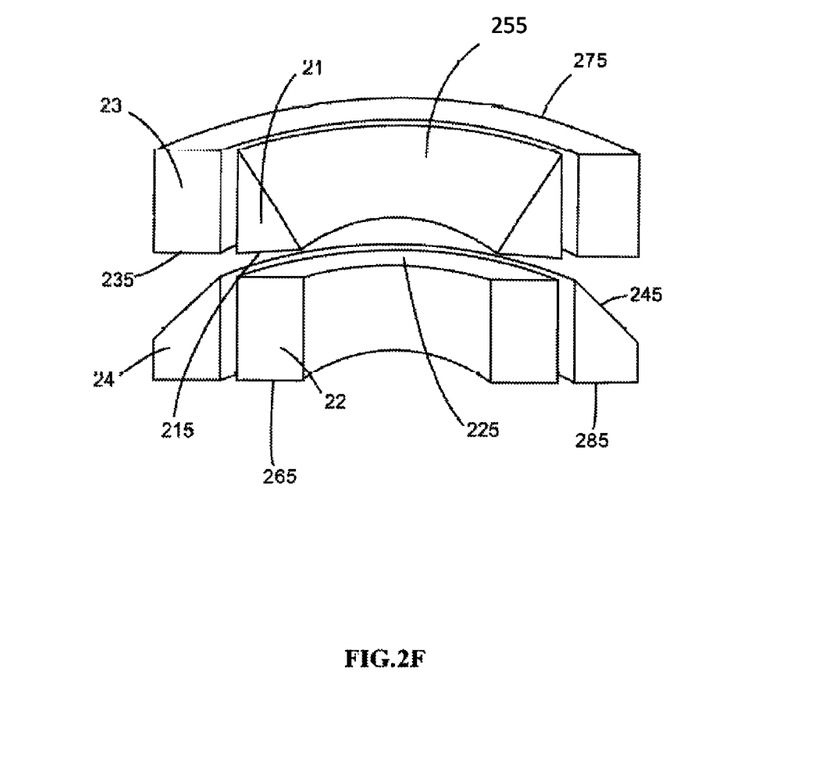
Figure 2G:
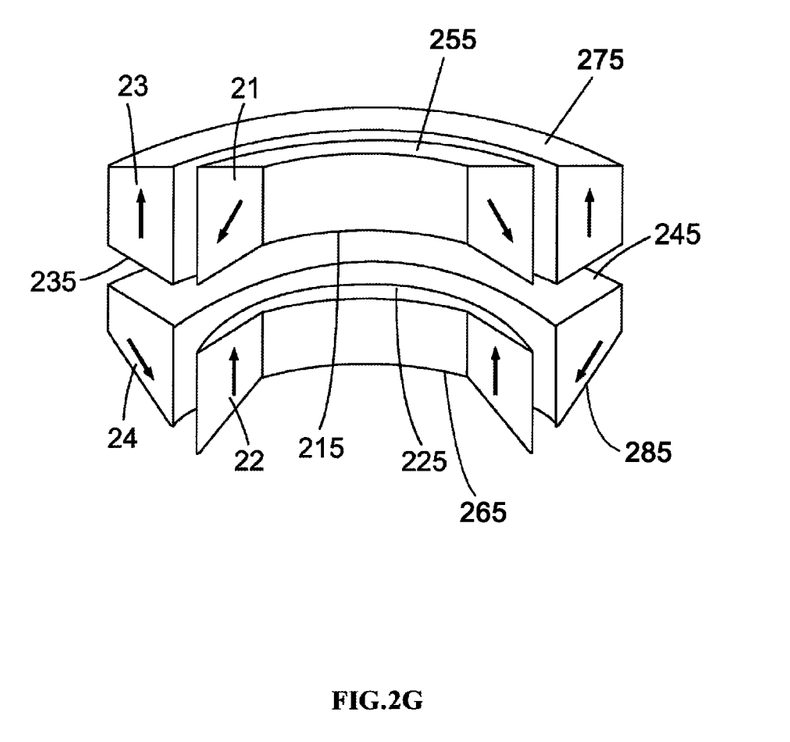

Furthermore, because all surfaces 215/225/235/245 are tilted, especially first and second surfaces 215/225 are tilted inwardly but third and fourth surfaces 235/245 are tilted outwardly, the invention can further reduce, even eliminate, the relative motion between first structure and second structure on the radical plane. For example, when first structure 201 is moved along a first direction in respect to the second structure 202 on the radical plane, first magnet ring 21 and third magnet ring 23 will be moved along the first direction in respect to second magnet ring 22 and fourth magnet ring 24. In the meaning time, as shown on FIG. 2C, on one side of the axis center of the magnet rings 21/22/23/24, first magnet ring 21 will leave away second magnet ring 22 so as to reduce the radical component of the net magnetic field B1, also third magnet ring 22 will come close to fourth magnet ring 24 so as to increase the radical component of corresponding net magnetic field. Hence, a radical component of net magnetic field is generated and points away the axis of the magnet rings 21/22/23/24. In contrast, on the opposite side of the axis of the magnet rings 21/22/23/24, first magnet ring 21 will come close to second magnet ring 22 so as to increase the radical component of the net magnetic field B1, also third magnet ring 23 will leave away fourth magnet ring 24 so as to reduce the radical component of corresponding net magnetic field. Significantly, the relative motion between the magnet rings 21/23 and the magnet rings 22/24 along one special direction will induce a variation of radical component of net magnetic field, where the variation will push the magnet rings 21/23 along another direction opposite to the special direction in respect to the magnets rings 22/234.

Accordingly, when the magnetized strength of each of magnet rings 21/22/23/24 are adjusted according to the practical application, it is possible to separate first structure and second structure, even to mutually separate magnet rings 21/22/23/24, so as to move first structure in respect to second structure. In this way, no matter axial movement or radical rotation/slide, these are no mechanical friction between the two structures and then some disadvantages of the conventional mechanical nearing can be improved, even avoided. For example, loss, friction, vibration and noise.

The details of the mechanical connection between the magnet rings 21/22/23/24 and the first/second structures are not limited. There are only three requirements" the relative distance between first magnet ring 21 and third magnet ring 23 can be fixed, the relative distance between second magnet ring 22 and fourth magnet ring 24 can be fixed, and the magnet rings 21/22/23/24 can be fixed on the first structure and the second structure.

The details of both first structure 201 and second structure 202 are not limited but have only one requirement that they may behave as the rotor and/or stator of a bearing system. Thus, each of the structures may be a plate having one surface contacted with magnet rings 21/22/23/24 and an opposite surface connected to other elements of the whole mechanism using the bearing system. For example, each of the structures 201/202 may be a combination of some parts of the mechanism when the combination of these parts may behave as a rotor or a stator. For example, in a perpendicular wind generator, first structure 201 may be a combination of the rotation fan, the rotation axis and the rotor of the electric generator, and second structure 202 may be the fixed base.

The tilted surface(s) of the magnet rings 21/22/23/24 not vertical perpendicular to the axial direction is used to generate the magnet field crossing the axial direction. Obviously, the more the tilted surfaces, the more the magnet fields crossing the axial direction. FIG. 2A shows the situation that each of magnet ring 21/22/23/24 has the tilted surface, which may maximize the number of the tilted surface. But, by comparing FIG. 2B and FIG. 2C, it can be found that the key is how to provide the radial component of net magnetic field for pushing first and second magnet rings 21/23 back, i.e., how many tilted surface are used to the radical component of net magnet filed field is not the key. Therefore, the invention only requires that at least one of magnet rings 21/22/23/24 has a surface being not perpendicular to the axial direction.

When one surface is not perpendicular to the axial direction, the degree of the angle between the surface and the axial direction also is adjustable. When the degree of the angle is close to ninety, the provided radial component of magnetic field is almost zero and then there is almost no radical bearing function. When the degree of the angle is closed to zero, the provided axial component of magnetic field is almost zero and then there is almost no axial bearing function. In general, the degree of such angle is between thirty and sixty, or even is approximate fourth-five. Nevertheless, the invention does not limit the degree of such angle. For example, for the perpendicular wind generator, the axial (perpendicular) gravity force is very large but the radical movement of the rotor is relative smaller. Thus, each tilted surface is almost perpendicular to the axial direction, where the degree of such angle is about eighty to eighty-five, for example.

The function of the tilted surface may be viewed as providing both non-zero axial and non-zero radical magnetic field between the upper group the magnet rings 22/24 and the lower group of magnet rings 21/23. Hence, although the cross-section shape of each of magnet rings 21/22/23/24 is parallelogram, even square, the invention still may use any magnet ring having different cross-sectional shape, because the shape and the size of each magnet rings 21/22/23/24 will affect the generated magnetic field. The only limitation is that two magnet rings facing each other along the axial direction must have non-zero axial and non-zero radical magnetic field therebetween simultaneously. For example, each of magnet rings 21/22/23/24 may have the following cross-sectional shape: trapezium, triangle, right-angled triangle, rhombus, trapezoid, or a combination thereof.

The effect of generating non-zero axial and radial magnetic filed field along the perpendicular direction between the upper and the lower magnet rings by the tilted surface(s) may be further enhanced. In numerous practical applications, because the magnet rings 21/22/23/24 are used to connect the first structure and the second structure (corresponds to the rotor and/or stator) on the opposite sides of the bearing system, to effectively fixed the magnet rings 21/22/23/24 to the first and second structure respectively, each of the magnet rings 21/22/23/24 usually has a flat back surface being not faced to other magnet rings, especially a flat back surface directly contacting the first/second structures. However, there are many variations about how to fix the magnet bars 21/22/23/24, the invention does not limit that the magnet rings 21/22/23/24 use flat back surface to contact the two structures. In other words, although all tilted surfaces are facing other magnet bearing(s) along the axial direction in these cases shown on FIG. 2A to FIG. 2C, the invention also may put the tilted surface as other surface of the magnet bearings. Of course, for these cases shown on FIG. 2A to FIG. 2C, the effect of the tilted surface(s) is more significantly, because the distance between the tilted surface and perpendicular opposite magnet ring is shorter.

Besides, because the tilted surface is used to non-zero axial and non-zero radical magnetic fields simultaneously, the tilted surface may be a flat plane, even may be a curve surface or a wave-like plane. Surely, different kinds of non-tilted surface will generate different magnetic field.

The magnetized direction of each of magnet rings 21/22/23/24 also is a key factor of this invention. In these situations shown on FIG. 2A to FIG. 2C, the magnetized direction of each of magnet rings 21/22/23/24 are equal or opposite to the axial direction. However, because the tilted surface(s) may generated non-zero axial/radical magnetic fields between upper and lower magnet rings 21/22/23/24, whether the magnetized direction of each of magnet rings 21/22/23/24 is equal or opposite to the axial direction will not invalidate the effect of the tilted surface(s). Hence, to generated the magnetic field distribution as shown on figures, the invention only requires that the magnetized directions are opposite between first magnet ring 21 and second magnet ring 22, and also that the magnetized directions are opposite between third magnet rings 23 and fourth magnetized rigs 24.

Clearly, the magnetized direction also as adjustable, different magnet rings 21/22/23/24 may have different magnetized directions. Further, the magnetized strength also is adjustable, each of magnet rings 21/22/23/24 may have individual magnetized strength. Because the magnetized direction and the magnetized strength are key factors of the generated magnetic field, also because the tilted magnetic field will change the magnetic field distribution between the magnet rings 21/22/23/24, it is an equivalent to directly change the magnetic field(s) generated by each of magnet rings 21/22/23/24.

Furthermore, the invention may use extra magnet(s) to enhance the effect of these magnet rings 21/22/23/24. One extra magnet is used to mechanically connect the fifth surface of first magnet ring 21 opposite to the first surface 215 and the seventh surface of third magnet ring 23 opposite to the third surface 235, and another extra magnet is used to mechanical connect the sixth surface of second magnet ring 22 opposite to the second surface 225 and the eight surface of fourth magnet ring 24 opposite to the fourth surface 245. In this way, first magnet ring 21 and third magnet ring 23 are connected to form a whole magnetic structure, and second magnet ring 22 and fourth magnet ring 24 are connected to form another whole magnetic structure. Therefore, the net magnetic field (B1, B2) between these magnet rings 21/22/23/24 may be enhanced, the spatial distribution of the magnetic flux may be limited, and also the direct interaction between the magnetic flux and the first/second structures may be decreased. However, the extra magnets are used to enhance the actions of the magnet rings 21/22/23/24, but are not necessary for this invention. Each of extra magnets may be made of permanent magnet material which is chosen from a group consisting of the following: hard ferrite magnet, Al—Ni—Co alloy, Sm—Co alloy, Ne—Fe—B alloy, or a combination thereof.

Note that the above discussions about the limitations on the magnetized directions of the two magnet rings 21/22/23/24 are based on one assumption: the external forces in the practical applications applied on the magnet rings 21/22/23/24, such as the gravity force of the rotor of the perpendicular system, pushes first and third magnet rings 21/23 close to second and fourth magnet rings 22/24. Hence, whenever the assumption is changed, the limitations on the magnetized direction of these magnet rings 21/22/23/24 have to be amended accordingly.

Figure 2H:
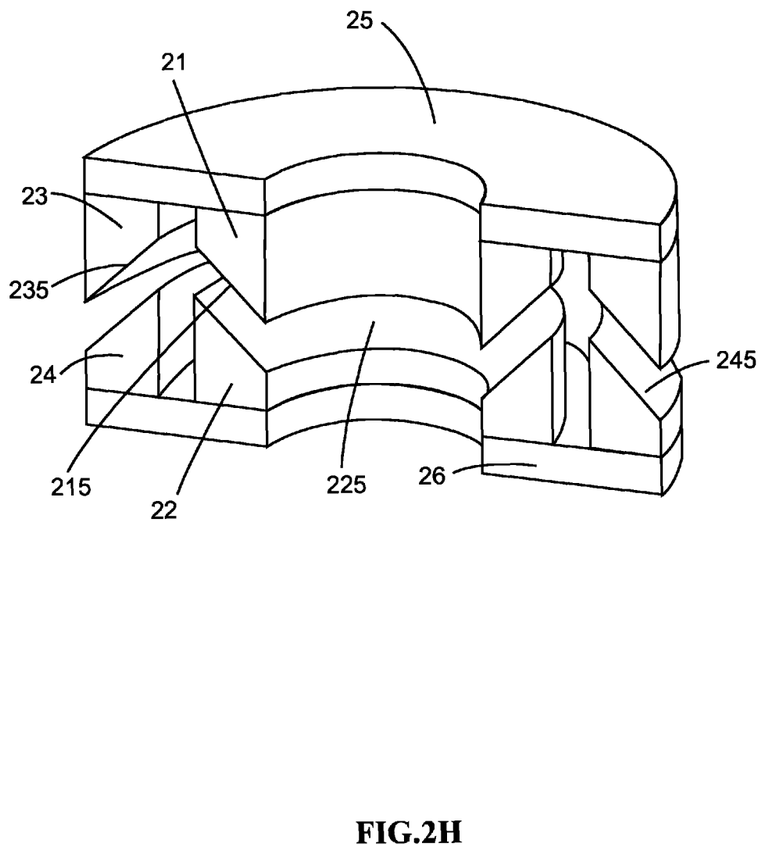
Figure 2I:
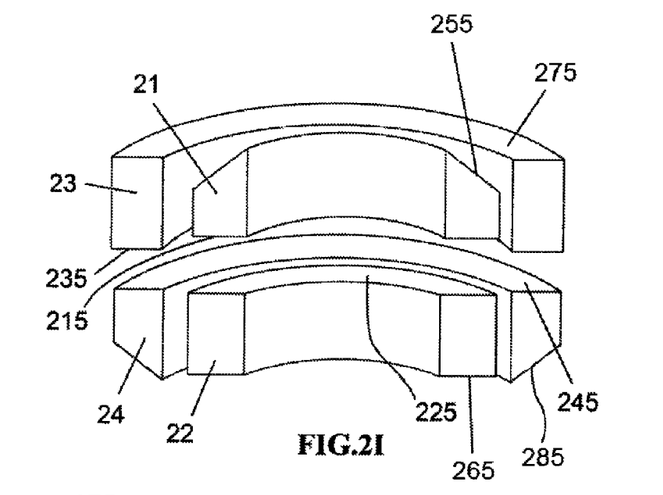
Figure 2J:
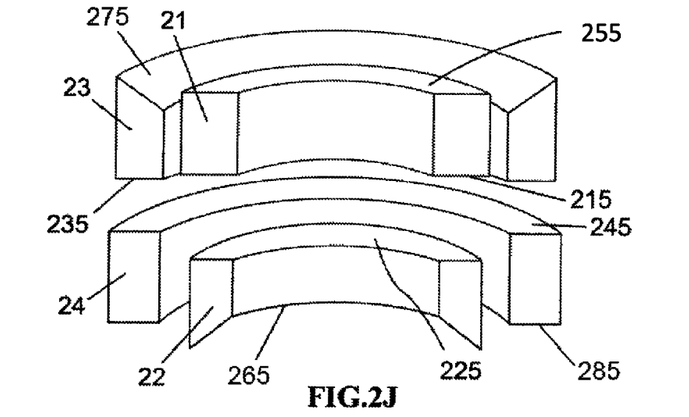

In short, according to the above discussions, FIG. 2D to FIG. 2H illustrate some possible variations of this invention so as to briefly present some possible combinations of the above possible varieties of the proposed invention. In those figures, first extra magnet 25, second extra magnet 26, fifth surface 255, sixth surface 265, seventh surface 276 and eighth surface 285 are new symbols, when other symbols had been presented on FIG. 2A to FIG. 2C. FIG. 2H illustrates the configurations having first extra 25 and second extra magnet 26, i.e., the configuration stated on the paragraph started on line 17 of page 13. FIG. 2D to FIG. 2G and FIG. 2I to FIG. 2J illustrate first to eighth surfaces 215~285, and some variations discussed above. Because the fifth to eighth surfaces 255~285 are directed contacted to the first structure 201 and/or the second structure 202 respectively, the existence of first/second structures 201/202 and the existence of the firth to eighth surface 215~285 are illustrated on different figures separately. Hence, related details and possible variations are not repeatedly discussed herein.

Although the present invention has been explained in relation to its preferred embodiments, it is to be understood that other modifications and variation can be made without departing the spirit and scope of the invention as hereafter claimed.

What is claimed is:

1. A hybrid type permanent magnet bearing system, comprising:
   a first permanent magnet ring, said first permanent magnet ring has a first surface and an opposite fifth surface;
   a second permanent magnet ring, said second permanent magnet ring and said first permanent magnet ring being arranged along an axial direction, said second magnet having a second surface and an opposite sixth surface, said second surface facing said first surface along said axial direction;
   a third permanent magnet ring, said third permanent magnet ring surrounding said first permanent magnet ring, said third magnet having a third surface and an opposite seventh surface; and
   a fourth permanent magnet ring, said fourth permanent magnet ring surrounding said second permanent magnet ring; said fourth permanent magnet ring and said third permanent magnet ring being arranged along said axial direction, said fourth permanent magnet ring having a fourth surface and an opposite eighth surface, said fourth surface facing said third surface along said axial direction;
   wherein said first permanent magnet ring, said second permanent magnet ring, said third magnet and said fourth magnet are mutually separated;
   wherein each of said first permanent magnet ring, said second permanent magnet ring, said third permanent magnet ring and said fourth permanent magnet ring is made of permanent magnet material and wherein said first permanent magnet ring and said third permanent magnet ring are mechanically connected to a first structure, and wherein said second permanent magnet ring and said fourth permanent magnet ring are mechanically connected to a second structure;
   wherein at least one of said first surface, said second surface, said third surface and said fourth surface being not perpendicular to said axial direction;
   wherein at least one of said fifth surface, said sixth surface, said seventh surface and said eighth surface being not perpendicular to said axial direction;
   wherein the magnetized direction of said first permanent magnet ring being opposite to the magnetized direction of said second permanent magnet ring, and the magnetized direction of said third permanent magnet ring is opposite to the magnetized direction of said fourth permanent magnet ring;
   wherein the magnetized direction of each of said permanent magnet rings being one of two direction parallel to said axial direction; and
   wherein said first surface and said second surface being parallel and the angle between said first surface and said axial direction having a non-zero degree, and said third surface being parallel to said fourth surface and perpendicular to said axial direction.

2. The system as claimed in claim 1, wherein said permanent magnet material is chosen from a group consisting of the following: hard ferrite magnet, Al—Ni—Co alloy, Sm—Co alloy, Ne—Fe—B alloy, or a combination thereof.

3. The system as claimed in claim 1, further comprising a first extra magnet and a second extra magnet, said first extra magnet mechanically contacting said fifth surface and said seventh surface, and said second extra magnet mechanically contacting said sixth surface and said eighth surface.

4. The system as claimed in claim 3, each of said extra magnet being made of permanent magnet material which is chosen from a group consisting of the following: hard ferrite magnet, Al—Ni—Co alloy, Sm—Co alloy, Ne—Fe—B alloy, or a combination thereof.

5. The system as claimed in claim 1, the degree of the angle between said axial direction and any said surface being between 30 degrees to 60 degrees.

6. The system as claimed in claim 1, the degree of the angle between said axial direction and any said surface being 45 degrees.

7. The system as claimed in claim 1, said first surface being parallel to said second surface, and said third surface being parallel to said fourth surface.

8. The system as claimed in claim 7, said first surface facing said fourth permanent magnet ring, and said third surface facing said second permanent magnet ring.

9. The system as claimed in claim 1, the shape of the cross-section of at least one said permanent magnet ring is rectangle.

10. The system as claimed in claim 1, the cross-sectional shape of at least one said permanent magnet ring is chosen from a group consisting of the following: trapezium, triangle, right-angled triangle, rhombus, trapezoid, or a combination thereof.

11. The system as claimed in claim 1, wherein said first structure is a rotor and said second structure is a stator.

* * * * *